United States Patent [19]

Gephardt et al.

[11] Patent Number: 5,598,539
[45] Date of Patent: Jan. 28, 1997

[54] APPARATUS AND METHOD FOR ACHIEVING HOT DOCKING CAPABILITIES FOR A DOCKABLE COMPUTER SYSTEM

[75] Inventors: Douglas D. Gephardt, Austin; Scott Swanstrom, Cedar Park, both of Tex.

[73] Assignee: Advanced Micro Devices, Inc., Sunnyvale, Calif.

[21] Appl. No.: 553,196

[22] Filed: Nov. 7, 1995

Related U.S. Application Data

[63] Continuation of Ser. No. 217,951, Mar. 25, 1994, abandoned.

[51] Int. Cl.$^6$ .................................................. G06F 13/20
[52] U.S. Cl. ..................... 395/281; 395/283; 364/DIG. 1
[58] Field of Search ................................... 395/500, 283, 395/281, 306, 309

[56] References Cited

U.S. PATENT DOCUMENTS

| | | | |
|---|---|---|---|
| 4,530,069 | 7/1985 | Desrochers | 395/822 |
| 4,769,764 | 9/1988 | Levanon | 361/680 |
| 4,835,737 | 5/1989 | Herrig et al. | 395/283 |
| 4,969,830 | 11/1990 | Daly et al. | 439/136 |
| 5,030,128 | 7/1991 | Herron et al. | 439/372 |
| 5,052,943 | 10/1991 | Davis | 439/357 |
| 5,126,954 | 6/1992 | Morita | 361/683 |
| 5,175,671 | 12/1992 | Sasaki | 361/686 |
| 5,187,645 | 2/1993 | Spalding et al. | 361/686 |
| 5,195,183 | 3/1993 | Miller et al. | 395/200.02 |
| 5,241,542 | 8/1993 | Natarajan et al. | 370/95.3 |
| 5,265,238 | 11/1993 | Canova, Jr. et al. | 395/500 |
| 5,272,584 | 12/1993 | Austruy et al. | 361/58 |
| 5,317,697 | 5/1994 | Husak et al. | 395/283 |
| 5,323,291 | 6/1994 | Boyle et al. | 361/686 |
| 5,386,567 | 1/1995 | Lien et al. | 395/700 |
| 5,394,552 | 2/1995 | Shirota | 395/750 |
| 5,454,080 | 9/1995 | Fasig et al. | 395/283 |
| 5,463,742 | 10/1995 | Kobayashi | 395/281 |
| 5,483,419 | 1/1996 | Kaczeus, Sr. et al. | 361/685 |

FOREIGN PATENT DOCUMENTS

| | | | |
|---|---|---|---|
| 0637793 | 2/1995 | European Pat. Off. | G06F 1/16 |
| 9209029 | 5/1992 | WIPO | G06F 1/18 |

OTHER PUBLICATIONS

HPSIR, Special Infrared Communications Specification, introduction pages and pp. 1–9.

*Primary Examiner*—Parshotam S. Lall
*Assistant Examiner*—Viet Vu
*Attorney, Agent, or Firm*—Foley & Lardner

[57] ABSTRACT

A dockable computer system is capable of performing hot docking or warm docking. Hot docking refers to an ability to dock when the portable computer or docking station are running at full power. Warm docking refers to an ability to dock when the portable computer and docking station are running in a reduced power state. The dockable computer system employs a docking agent which is capable of quieting (rendering inactive) the buses of the portable computer and docking station in response to a notice signal. The notice signal is indicative of a change of states from the undocked state to the docked state or from the docked state to the undocked state. The notice signal can be provided from software, a user-actuated switch, or an infrared signal. The docking agent preferably quiets the system bus by idling the system bus or asserting bus ownership or bus mastership over the system bus. The docking agent is able to assert bus ownership or bus mastership over the system bus. Alternatively, the docking agent can perform a software idle subroutine or an interrupt subroutine which idles the system bus. Preferably, the system bus is idled by disabling clock signals to it. Preferably, the docking agent also removes bus ownership requests, interrupt requests, and DMA requests from the station bus and system bus.

21 Claims, 3 Drawing Sheets

5,598,539

APPARATUS AND METHOD FOR ACHIEVING HOT DOCKING CAPABILITIES FOR A DOCKABLE COMPUTER SYSTEM

RELATED APPLICATION

This is a Continuation of application Ser. No. 08/217,951 filed Mar. 25, 1994 abandoned.

The present application is co-pending related to U.S. patent application Ser. No. 08/217,952, filed Mar. 25, 1994, entitled "A Dockable Computer System Capable of Electric and Electromagnetic Communication." The present application is also related to U.S. co-pending application Ser. No. 08/255,663 filed by Gephardt et al. on Jun. 9, 1994, and U.S. co-pending application Ser. No. 08/280,314 filed by Gephardt et al. on Jul. 26, 1994.

TECHNICAL FIELD

The present invention relates generally to a dockable computer system in which a portable computer unit is associated with a stationary host computer through a station unit and, more particularly, to a system and method for implementing the system in a manner enabling the portable and station units to be physically combined or separated when the units are powered on.

BACKGROUND OF THE INVENTION

A dockable computer system includes a portable computer, usually a notebook or laptop, and a stationary or base computer unit having a docking station for receiving the portable unit. Dockable computer systems may be operated in a docked state, in which both computer units are physically associated as a generally unified system, or the remote unit may be separated from its host for independent operation in an undocked state.

Rudimentary docking systems of the foregoing variety have been designed in an effort to meet the needs of today's mobile computer users for "ubiquitous" computing system capabilities, to fulfill their computing needs in diverse aspects of their professional and personal lives and in sundry locations. Contemporary dockable computer systems approach this problem through a single system capable of operating as an expandable desktop computer having a detachable mobile computing component or subsystem.

The expandable desktop computer provides greater storage resources, network connectivity, larger displays, and other superior facilities which are necessary for the typical range of generally demanding home and office computing. The portable computer (mobile computer unit) allows the user to have computing capabilities while outside the home or office by detaching that component with its indigenous hardware and resident software. The computing capabilities of the portable computer are somewhat limited due to size, weight and power constraints but represent the best available approach in these embryonic attempts to balance portable mobility needs.

When the user leaves the host environment of home or office, the portable computer is undocked (that is, physically detached) from the docking station of the stationary computer unit. Applications, files, and other data needed for the mobile computing task must have previously been stored in the portable computer. When the user returns to the host environment, the portable computer is reunited (docked) with the docking station so that the applications, the files, and other data are stored and maintained in a single location.

Thus, the use of a dockable computer system allows the user to have access to any needed applications, files, and other data just before embarking on the mobile computing task.

When the dockable computer system changes states from the undocked state to the docked state or the docked state to the undocked state (a docking event), protective measures are required to prevent signaling failures, bus crashes, and component damage caused by physically connecting or disconnecting the active buses of the portable computer and the docking station. Contemporary dockable computer systems are "cold docking" systems which protect the buses only by powering off the portable computer and docking station, rendering the buses inactive so protective measures are not required. These "cold docking" systems are disadvantageous because the user must wait for the dockable computer system to be turned on, rebooted, and reconfigured before the dockable computer system is operational in the docked state. Thus, contemporary dockable computer systems are inconvenient because of the amount of time required to change from the docked state to the undocked state or from the undocked state to the docked state.

There is a need for a "hot docking" computer system and a "warm docking" computer system. A "hot docking" computer system as envisioned herein is a dockable computer system which can change states with the portable computer running at full power. A "warm docking" system may be thought of as a dockable computer system which can change when the portable computer is in a reduced power state when the portable computer is not running at full power. Examples of the reduced power state are the suspend state and standby state now incorporated in some microprocessor systems. Hot docking and warm docking systems advantageously enable the user to more immediately begin computer tasks because the systems are powered on throughout the docking event.

Thus, there is a need for a dockable computer system which includes circuitry that allows the dockable computer system to change states while powered on. More particularly, there is a need for a dockable computer system which includes circuitry for protecting the active buses of the portable computer and docking station when the system is docked or undocked.

SUMMARY OF THE INVENTION

The present invention relates to a dockable computer system capable of assuming a docked state and an undocked state. The dockable computer system includes a notice circuit for providing a notice signal when the dockable computer system is in an undocked state prior to attaining the docked state. The dockable computer system includes a host station including a host bus coupled with a host connector, a portable computer including a computer bus coupled with a computer connector, and a docking agent. The host connector is physically coupled with the portable connector when the dockable computer system is in the docked state, and the host connector is physically separate from the computer connector when the dockable computer system is in the undocked state. The docking agent is coupled with the computer bus and includes a notice input for receiving the notice signal. The docking agent quiets the computer bus in response to the notice signal.

The present invention also relates to a method of docking a portable computer having a computer bus with a host station having a host bus. The computer bus is physically, electrically coupled with the host bus when the portable computer is docked with the host station. The method includes the steps of providing a notice signal incipient to physically, electrically coupling the host bus with the computer bus, quieting the computer bus in response to the notice signal, physically electrically coupling the host bus with the computer bus, and then releasing the computer bus in response to the portable system being physically electrically coupled with the docking bus.

The present invention further relates to a computer operable in an undocked state or a docked state with a station having a station bus. The computer includes a bus and a computer connector coupled with the bus. The station includes a station connector coupled with the station bus. The computer connector is coupled with the station connector when the computer is operable in the docked state, and the computer connector is separate from the station connector when the computer is operable in the undocked state. The computer includes a CPU capable of physical electrical communication with the bus of the computer, and a docking agent coupled with the bus of the computer. The docking agent ensures that the bus of the computer is quiet prior to the computer changing states.

The present invention further relates to a dockable computer system including a host computer station and a mobile live computer unit. The host computer station includes a station bus, and the mobile computer unit includes a unit bus. The dockable computer system is capable of residing in at least two distinct states, a docked state in which the unit is operatively associated with the station, and an undocked state in which the unit is physically separate from the station. The improvement includes a docking agent coupled to the unit bus which quiets the unit bus when the system changes from the undocked state to the docked state or from the docked state to the undocked state.

The present invention advantageously provides a docking agent which enables the dockable computer system to be docked and undocked while powered on. The docking agent advantageously provides measures to protect the buses of the portable computer and docking station. The docking agent advantageously quiets the buses of the portable computer and docking station in response to a notice signal warning of the docking event.

In one aspect of the present invention, the docking agent quiets the buses by asserting bus ownership or mastership. In another aspect of the present invention, the docking agent quiets the buses of the portable computer and docking station by initiating a software subroutine which disables clock signals on the buses. In still a further aspect of the present invention, the docking agent is an off-line device coupled with the bus of the portable computer. In yet a further aspect of the present invention, the docking agent is an in-line device which isolates and protects the bus of the portable computer.

BRIEF DESCRIPTION OF THE DRAWINGS

The invention will hereafter be described with reference to the accompanying drawings, wherein like numerals denote like elements, and.

DETAILED DESCRIPTION OF THE PREFERRED EXEMPLARY EMBODIMENTS

Figure 1:
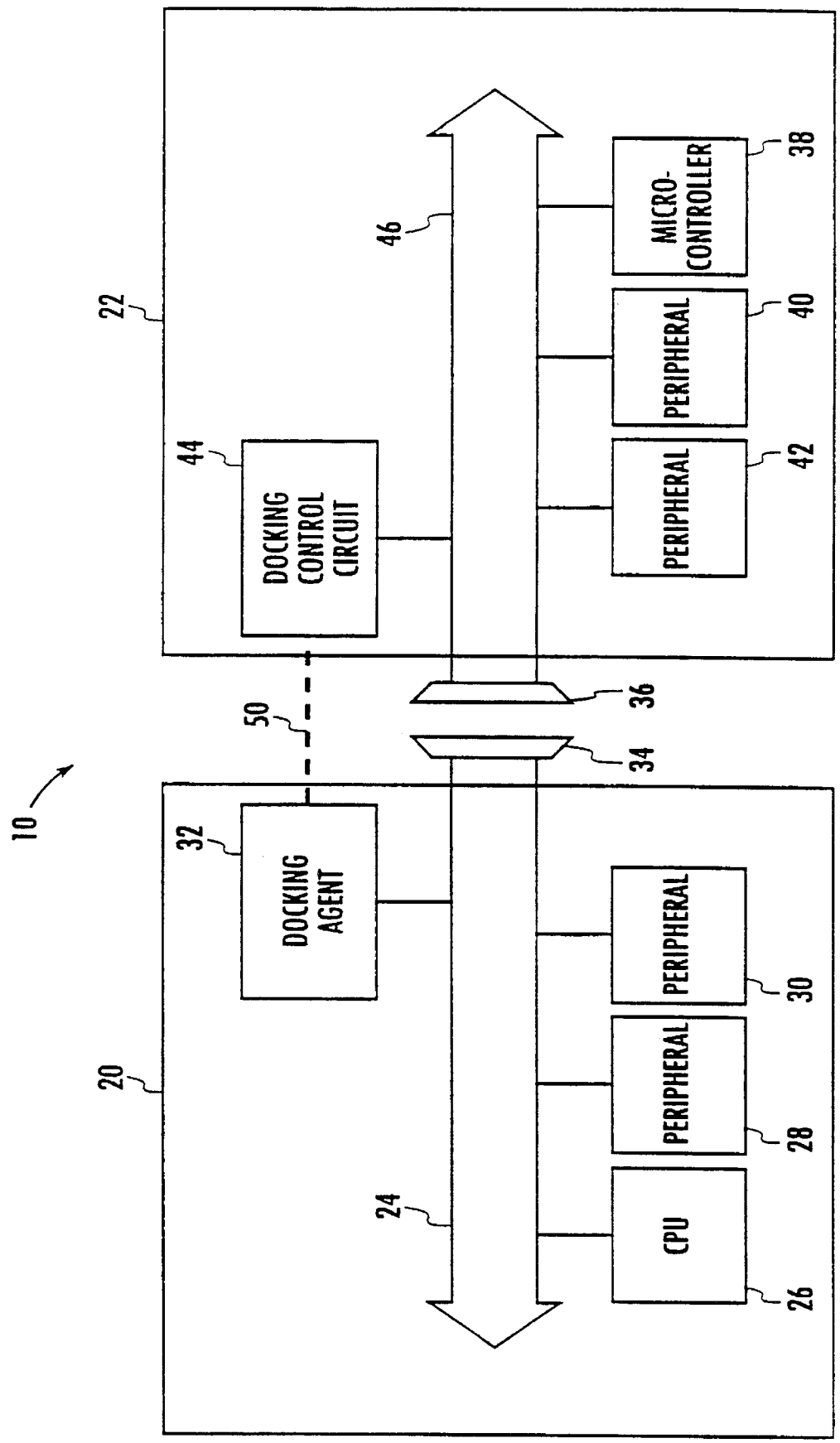
FIG. 1 illustrates a dockable computer system in accordance with a first exemplary embodiment of the present invention.

FIG. 1 is a schematic block diagram of a dockable computer system 10 including a portable computer 20 and a docking (host) station 22. Portable computer 20 is a mobile computer unit including a CPU 26, a system bus 24, and a docking agent 32. Portable computer 20 can also include a peripheral device 28 and a peripheral device 30. System bus 24 couples CPU 26, peripheral device 28, peripheral device 30, and docking agent 32. An external connector 34 is also coupled with system bus 24. System bus 24 can be a CPU-to-memory bus, an I/O bus, a standard bus, PCI bus, a sub-bus, a span bus, or any type of bus functionally operative in the microcomputer environment.

Docking station 22 includes a docking control circuit 44 coupled with a docking bus 46. Docking station 22 can also include a microcontroller 38, a peripheral device 40, and a peripheral device 42. Microcontroller 38 can be replaced by a more powerful microprocessor as warranted by applications for system 10, and it is within the scope of the present invention to utilize a minicomputer as the host system should the user so desire. Docking station 22 is a host station which can have superior, equal or inferior computing power compared to portable computer 20.

Docking bus 46 couples docking control circuit 44, microcontroller 38, peripheral device 40 and peripheral device 42. An external connector 36 is also coupled with docking bus 46. Docking bus 46 can be a CPU-to-memory bus, an I/O bus, a standard bus, a PCI bus, a sub-bus, a span bus, or any type of bus as noted generally above.

When dockable computer system 10 is in an undocked state, external connector 34 and external connector 36 are not physically coupled. Therefore, in the undocked state, system bus 24 and docking bus 46 are not in physical electrical communication. In the undocked state, portable computer 20 is operable as a stand-alone computer and is physically separate from docking station 22.

When dockable computer system 10 is in a docked state, external connector 34 and external connector 36 are physically coupled. With connectors 34 and 36 coupled, CPU 26 can electrically communicate with components in docking station 22 such as peripheral device 42, peripheral device 40, or microcontroller 38 via system bus 24, connectors 34 and 36, and docking bus 46. In the docked state, docking station 22 receives portable computer 20 so that dockable computer system 10 operates as a single desktop computer or an integrated computer system.

When dockable computer system 10 is about to change states (a docking event), dockable computer system 10 preferably provides an ADVANCE NOTICE signal warning of the impending docking event. Preferably, docking control circuit 44 includes circuitry for sensing an impending docking event and for communicating the ADVANCE NOTICE signal across a communication link 50, as described below.

The ADVANCE NOTICE signal can be provided on system bus 24, docking bus 46, communication link 50, or various control lines in dockable computer system 10. For example, when dockable computer system 10 changes from an undocked state to a docked state, communication link 50 preferably provides an ADVANCE NOTICE (warning) signal which is received by docking agent 32. Docking agent 32 preferably includes communication circuitry such as infrared communication circuitry similar to HPSIR two way wireless communication ports for transmitting or receiving messages across communication link 50. Communication link 50 can be an electromagnetic communication link, long pin interface, or wireless communication link such as those disclosed in U.S. patent application Ser. No. 08/217,952, filed Mar. 25, 1994, and entitled, "Dockable Computer System Capable of Electric and Electromagnetic Communication" assigned to the assignee of the present invention.

Alternatively, portable computer 20 or docking station 22 can provide a software-actuated ADVANCE NOTICE signal or a user-actuated ADVANCE NOTICE signal. The user-actuated ADVANCE NOTICE signal can be provided by manipulating keys on a keyboard (not shown), by activating a button (not shown) provided on the dockable computer system 10, or by verbally relating a dock or undock command to voice actuation circuitry (not shown). Further still, a switch (not shown) or sensor (not shown) can be disposed on portable computer 20 or docking station 22 so that the switch or sensor is provides the ADVANCE NOTICE signal when portable computer 20 is about to be united with or separated from docking station 22.

Preferably, docking agent 32 operates to quiet or render inactive system bus 24 before system bus 24 and docking bus 46 are physically coupled or uncoupled during a docking event. Docking agent 32 is shown as an off-line device which can or can not be involved in the non-docking operations of portable computer 20.

Preferably, docking agent 32 operates similarly to a PCI agent device, host agent device, standard agent device, or any device capable of quieting a bus. Docking agent 32 can also provide signal buffering, protocol translation, data caching, data packet assembly/disassembly, and any number of system-specific functions. Similarly, docking control circuit 44 can additionally provide "docking agent" functions for docking bus 46.

Docking agent 32 quiets system bus 24 by controlling active transfers occurring on system bus 24, generally by ensuring that there are no active transfers occurring on bus 24. Preferably, docking agent 32 quiets bus 24 in response to the ADVANCE NOTICE signal. Docking agent 32 quiets bus 24 by asserting bus ownership over system bus 24, asserting bus mastership over bus 24, performing a software idle subroutine, performing an interrupt service routine which idles bus 24, or rendering bus 24 inactive.

Asserting and achieving bus ownership or bus mastership over system bus 24 ensures that no other components are granted access to bus 24. Bus ownership or bus mastership prevents other components from initiating, continuing, or completing bus transfers. Docking agent 32 can assert bus ownership or mastership by providing a bus request signal to a bus arbiter (not shown). The bus arbiter is generally integrated in CPU 26 or other logic in the chip set associated with portable computer 20. The bus arbiter grants ownership or mastership to docking agent 32 by providing an acknowledge signal to docking agent 32. Once granted ownership or mastership, docking agent 32 maintains it until the docking event is complete.

Alternatively, docking agent 32 can idle system bus 24 by disabling clock signals to it, for example by gating the clock signals through an AND gate having one input grounded to a logic LOW in response to the ADVANCE NOTICE signal. Disabling clock signals to bus 24 ensures that no other components initiate, continue, or complete bus transfers. Alternatively, docking agent 32 can provide a signal to CPU 26 or other circuitry (not shown) to disable the clock signals, or a software subroutine or interrupt subroutine can programmatically disable the clock signals to bus 24. As another alternative, a software subroutine or interrupt subroutine can idle bus 24 by commanding components on bus 24 to be in an off, suspend, halt, or other idle state.

Docking agent 32 preferably ensures that microcontroller 38, peripheral device 40, and peripheral 42 are not asserting requests for access to system bus 24, asserting interrupt requests, or asserting direct memory access (DMA) requests. By preventing these requests, docking agent 32 safeguards against spurious events occurring on system bus 24 when bus 24 and 46 are coupled. Alternatively, docking control circuit 44 can operate to prevent these requests from occurring. Also, docking control circuit 44 can operate to quiet or render inactive docking bus 46 before docking bus 46 and system bus 24 are coupled or uncoupled during a docking event.

Portable computer 20 and docking station 22 illustrated in FIG. 2 operate similarly to dockable computer system 10 discussed with reference to FIG. 1. However, dockable computer system 10 in FIG. 2 includes a docking agent 33 and a docking control circuit 45 shown to be in-line devices.

Docking agent 33 is coupled between system bus 24 and a connector bus 25. Docking control circuit 45 is coupled between a connector bus 47 and docking bus 46. Connector bus 25 is preferably coupled to external connector 34, and connector bus 47 is preferably coupled to external connector 36. Docking agent 33 preferably operates to quiet connector bus 24 when system 10 is about to change states. Docking control circuit 45 also preferably quiets connector bus 47 when system 10 is about to change states. Docking agent 33 and docking control circuit 45 can also operate to quiet system bus 24 and docking bus 46. Either docking agent 33 or docking control circuit 45 can be replaced by an off-line device similar to agent 32 or circuit 44 discussed with reference to FIG. 1 so that in-line agent 33 or in-line circuit 45 operates with an off-line agent 32 or off-line circuit 44.

Docking agent 33 and docking control circuit 45 operate as in-line devices and can isolate connector bus 25 from system bus 24 and connector bus 47 from docking bus 46. Docking agent 33 and docking control circuit 45 preferably include filter capability, drive capability, voltage level translation capability, and buffering capability. Buffering capability can include tri-stated inputs and outputs for isolating buses 24 and 46 by utilizing a high impedance state. Therefore, portable computer 20 can maintain normal operations during a docking event because system bus 24 is isolated by docking agent 33 from external connector 34. Also, docking station 22 can perform normal operations on docking bus 46 during a docking event because docking control circuit 45 isolates docking bus 46 from external connector 36. Additionally, docking agent 33 and docking control circuit 45 operating as in-line devices support data buffering and bridging functions such as write buffers (FIFOs) and allow bus concurrency. Further still, docking agent 33 and docking control 45 operating as in-line devices provide electromagnetic interference (EMI) protection and radio frequency interference (RFI) protection.

Figure 3:
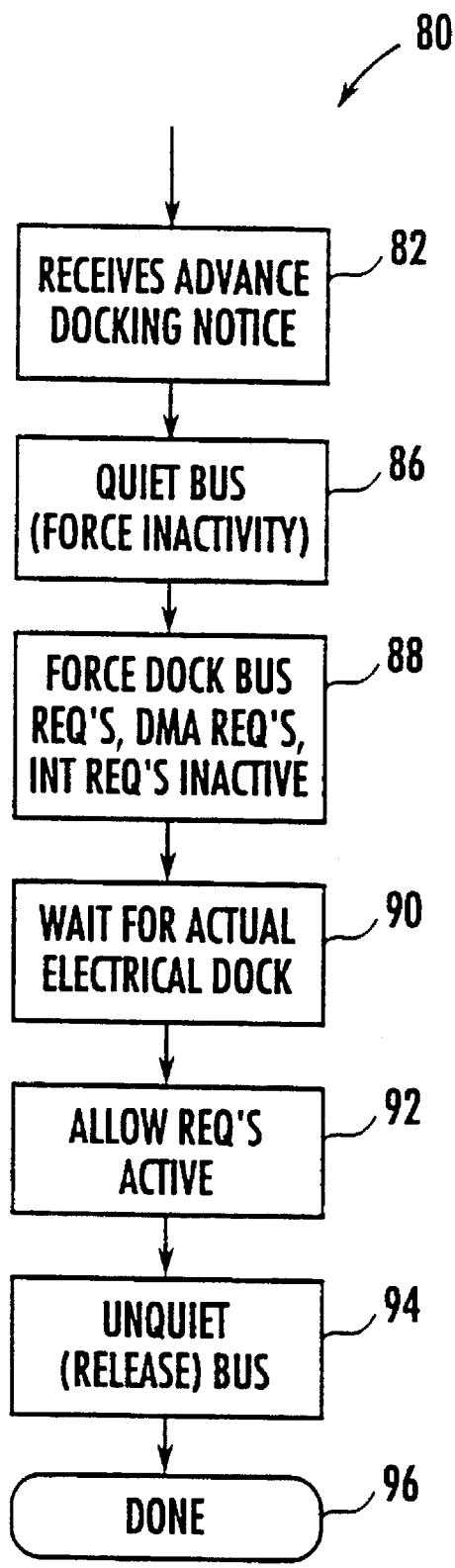
FIG. 3 is a simplified flow chart of a dockable event for the dockable computer systems illustrated in FIGS. 1 and 2.

FIG. 3 is a flow chart of the operation of dockable computer system 10 during a docking event 80. The operation of dockable computer system 10 is described below with reference to FIGS. 1 and 3. Docking event 80 can involve a coupling or an uncoupling of buses 24 and 46. Dockable computer system 10 provides the ADVANCE NOTICE signal which warns of the impending coupling or uncoupling of buses 24 and 46. The ADVANCE NOTICE signal can provide information indicative of the type of docking event 80 (dock or undock), as well as other information such as the identification of portable computer 20 and docking station 22, the speed of buses 24 and 46, the voltage interface of buses 24 and 46, or the number and types of peripheral devices 28, 30, 40 and 42 in system 10.

Docking agent 32 quiets system bus 24 in response to the ADVANCE NOTICE signal as shown in a block 86. Preferably, docking control circuit 44 also quiets docking bus 46 in response to the ADVANCE NOTICE signal. Buses 24 and 46 can be quieted by asserting bus ownership, asserting bus mastership, asserting a software idle subroutine, or performing an interrupt service routine. Docking agent 32 preferably asserts bus ownership by requesting control of system bus 24. Once control is granted, docking agent 32 retains bus ownership so that other components such as CPU 26, peripheral device 28, and peripheral device 30 cannot provide signals to system bus 24. Docking agent 32 can also be a bus master which quiets system bus 24 by asserting bus mastership over system bus 24.

Docking agent 32 can also quiet system bus 24 initiating a software idle subroutine which turns off clock signals on system bus 24. Preferably, docking agent 32 interrupts CPU 26 so that CPU 26 idles system bus 24. CPU 26 can idle system bus 24 by disabling clock signals on system bus 24.

Preferably, CPU 26 receives a system management interrupt (SMI) in response to the ADVANCE NOTICE signal. CPU 26 preferably performs a software subroutine in response to the SMI. The software subroutine identifies the cause of the SMI and utilizes logic circuitry to quiet bus 24 by disabling the clock signals on system bus 24 or by commanding components on system bus 24 to an off, suspend, halt, or other idle state.

After a short amount of time, such as several microseconds, docking agent 32 is able to quiet system bus 24 and docking control circuit 44 is able to quiet docking bus 46. As shown in block 88, docking agent 32 is preferably able to force requests for control of buses 24 and 46 to become inactive, to force DMA requests to become inactive, and force interrupt requests to become inactive. Forcing these requests inactive prevents spurious events occurring on buses 24 and 46 during docking event 80. Docking agent 32 can force these requests to become inactive by gating the request lines (not shown) for buses 24 and 46 through a logic circuit (not shown). The logic circuit preferably gates these request lines off in response to the ADVANCE NOTICE signal.

As shown in a block 90, docking agent 32 preferably waits for actual electrical connection of external connectors 34 and 36. Dockable computer system 10 can provide a RELEASE signal indicative of actual electrical connection on system bus 24 on docking bus 46. Alternatively, the RELEASE signal can be provided by communication link 50.

Actual electrical connection can be determined by sense circuitry coupled with bus 24 or bus 46. For example, part of bus 46 or dedicated conductors (not shown) in system 10 can provide a signal to the sense circuitry when bus 46 is physically coupled with bus 24. The sense circuitry decodes this signal and produces the RELEASE signal. Alternatively, mechanical switches (not shown) or other sensors (not shown) can be deployed to sense when external connectors 34 and 36 are physically coupled, indicating an actual electrical connection. Further still, conductors on buses 24 and 46 can be monitored until particular or threshold voltage levels occur on buses 24 and 46 indicating the presence or absence of actual electrical connection.

For example, a comparator (not shown) may be utilized which has a first input which receives a threshold voltage between VCC and ground and a second input which receives a logic high signal transmitted across either connector 34 or 36. If connectors 34 and 36 are not coupled, the second input receives a low voltage signal which is less than the first signal and the comparator provides a logic low. If connectors 34 and 36 are coupled, the second input receives the second signal which is greater than the first signal. Therefore, the comparator provides a logic high indicative of the actual electrical connection. In another alternative, a pin (not shown) of connector 34 may be connected to a resistor (not shown) which is coupled to ground when system 10 is in an undocked state. The pin is coupled to VCC through connector 36 when system 10 is in a docked state. Therefore, the pin is pulled up by the resistor to a logic high which is indicative of the actual electrical connection when connectors 34 and 36 are coupled.

The RELEASE signal can be provided as a message across communication link 50, on buses 24 or 46, or on other control lines in system 10. Preferably, docking agent 32 waits a particular amount of time such as 100–250 milliseconds after the actual electrical connection so that buses 24 and 46 are stabilized.

Docking agent 32 preferably allows requests for control of buses 24 and 46, for interrupts, and for DMA to become active in response to the RELEASE signal as shown in a block 92. Preferably, docking agent 32 enables the request lines for control, interrupts, and DMA by gating request lines back on. Next, docking agent 32 "unquiets" or releases system bus 24, as shown in a block 94. Docking agent 32 can release system bus 24 by enabling clock signals on system bus 24 or releasing bus ownership or mastership. Preferably, docking agent 32 releases bus ownership or mastership by removing the bus request signal to the bus arbiter. Thus, after system bus 24 is released, docking event 80 is complete, as shown in a block 96. Thus, after block 96, the user is advantageously ready for immediate use of system 10.

Figure 2:
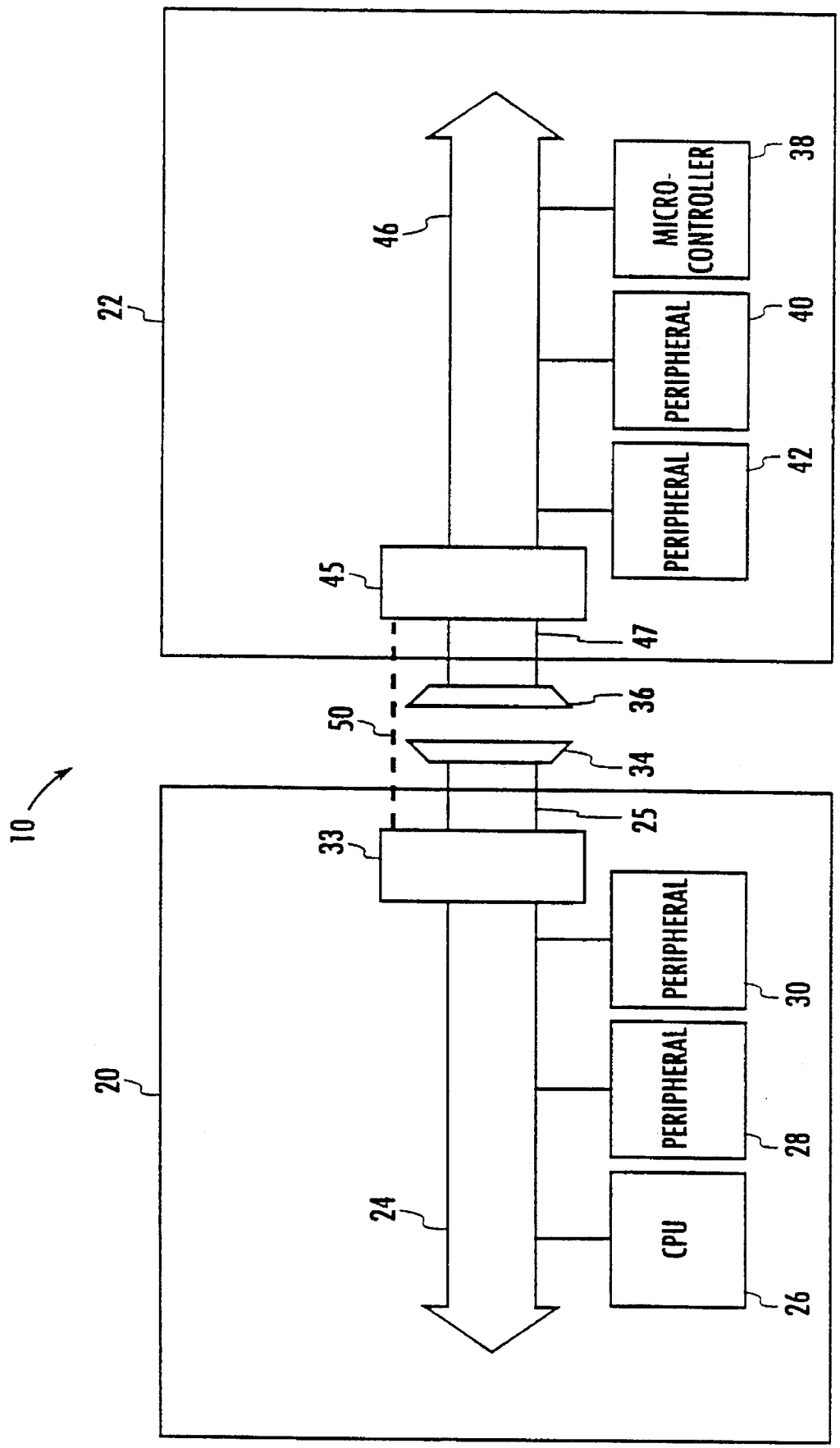
FIG. 2 illustrates a dockable computer system in accordance with a second exemplary embodiment of the present invention.

With reference to FIGS. 2 and 3, docking event 80 is essentially the same for system 10 illustrated in FIG. 2 as it is for system 10 illustrated in FIG. 1. Docking agent 33 and docking control circuit 44 preferably utilize the same techniques described for docking agent 32 and docking control circuit 44. However, docking agent 33 and docking control circuit 45 preferably provide a buffer between system bus 24 and docking bus 46. This buffer advantageously isolates and protects buses 24 and 46 from malfunction during docking event 80. However, docking agent 33 and docking control circuit 45 must cooperate to quiet connector bus 25 and connector bus 47 during docking event 80.

Docking agent 33 and docking control circuit 45 advantageously allow portable computer 20 and docking station 22 to be operational during docking event 80. For example, once docking agent 33 isolates system bus 24 from connector bus 25, portable computer 20 can continue operations on system bus 24 as system 10 changes states. Preferably, docking agent 33 isolates system bus 24 and quiets connector bus 25 in response to the ADVANCE NOTICE signal. Also, docking control circuit 45 can operate to isolate docking bus 46 and quiet connector bus 47 in response to the ADVANCE NOTICE signal. Preferably, docking agent 33 and docking control circuit 45 operate as a PCI-to-PCI bridge capable of signal buffering, protocol translation, data caching, data packet assembly/disassembly, and any number of system specific functions. Alternatively, docking agent 33 and docking control circuit 45 can be similar to a host-to-PCI bridge, a PCI-to-standard bridge, a host-to-host bridge, a PCI-to-PCI bridge, a standard-to-standard bridge, or other types of bridges.

It is understood that, while the detailed drawings and specific examples given describe preferred exemplary embodiments of the present invention, they are for the purpose of illustration only. The apparatus and method of the invention is not limited to the precise details and conditions disclosed. For example, although a docking agent is shown coupled directly with a communication link, a docking agent could communicate with the communication link across the system bus. Also, although the system bus is shown, a sub-bus or secondary bus could be utilized. Although a portable computer is described, the system is appropriate for any mobile computer unit including personal digital assistants (PDAs). Further, single lines in the various drawings can represent multiple conductors. Various changes can be made to the details disclosed without departing from the spirit of the invention which is defined by the following claims.

We claim:

1. A dockable computer system capable of assuming at least two states, a docked state and undocked state, said dockable computer system including a notice circuit for providing a notice signal when said dockable computer system is in said undocked state prior to attaining said docked state, said dockable computer system comprising:

a host station including a host bus coupled with a host connector;

a portable computer including a processor, a computer bus, and a connector bus coupled with a computer connector, said host connector physically coupled with said portable connector when said dockable computer system is in said docked state, said host connector being physically separate from said computer connector when said dockable computer system is in said undocked state; and an in-line docking agent coupled between said computer bus and said connector bus, said docking agent having a notice input for receiving said notice signal, said docking agent quieting said computer bus without suspending said processor in said portable computer by obtaining bus mastership of said computer bus and disabling a bus clock signal for said bus in response to said notice signal, said in-line docking agent performing at least one of a buffering function, a voltage level translation function, a filtering function, or a bus driving function on signals being communicated between said computer bus and said connector bus, whereby said portable computer remains powered ON during the transition of the system from said undocked state to said docked state.

2. The dockable computer system of claim 1 wherein said docking agent provides data buffering and bridging functions on said signals being communicated between said computer bus and said connector bus, and said docking agent includes tri-state buffer switches for performing the data buffering function.

3. The dockable computer system of claim 1 wherein said docking agent is a bus master of said portable system bus.

4. The dockable computer system of claim 1 wherein said docking agent quiets said bus by using a software subroutine.

5. The dockable computer system of claim 4 wherein said docking agent provides an interrupt, said interrupt triggering operation of said software subroutine.

6. The dockable computer system of claim 4 wherein said software routine is run by said portable computer.

7. The dockable computer system of claim 1 wherein said host station further includes a host in-line docking agent coupled between said host bus and said host connection, said host in-line docking agent having a host notice input for receiving said notice signal, said host in-line docking agent quieting said host bus in response to said notice signal, whereby said host station remains powered on during transition of the system from said undocked state to said docked state.

8. The dockable computer system of claim 1 wherein said docking agent forces any of DMA requests, bus requests, and interrupt requests inactive in response to the notice signal.

9. A method of docking a portable computer having a computer bus with a host station having a host bus, said computer bus being in electrical communication with said host bus through a connector bus when said portable computer is docked with said host station, said portable computer including a processor and an in-line docking agent coupled between the computer bus and the host bus when the portable computer is docked with the host station, the computer bus being separated from said connector bus by said in-line docking agent said method comprising the steps of:

providing a notice signal incipient to physically electrically coupling said host bus with said computer bus;

quieting said computer bus and said connector bus with said docking agent in response to said notice signal without suspending said processor in said portable computer by obtaining bus mastership of said computer bus and disabling a bus clock signal for said bus;

physically coupling said host bus with said connector bus thereby coupling said lost bus with said computer bus through said docking agent and said computer bus; and releasing said computer bus in response to said portable system bus being physically electrically coupled with said docking bus, whereby said portable computer remains powered ON when said portable computer is docked with said host station.

10. The method of claim 9 further comprising the step of:

quieting said host bus in response to said notice signal.

11. The method of claim 10 further comprising the step of releasing said host bus in response to said computer bus being physically electrically coupled with said docking bus.

12. The method of claim 9 wherein said portable computer and said host station include an infrared communication link and said notice signal is provided in response to infrared signals provided across said infrared communication link.

13. The method of claim 9 wherein said notice signal is provided in response to a mechanical switch.

14. The method of claim 9 further comprising the step of:

forcing bus requests, DMA requests, or interrupt requests to become inactive.

15. The method of claim 9 wherein said quieting step includes gating said bus clock signal to a logic low.

16. A computer operable in an undocked state or a docked state with a station having a station bus, said computer including a bus and a computer connector coupled with said bus of said computer, said bus of said computer including a data bus, said station including a station connector coupled with said station bus, said computer connector being coupled with said station connector when said computer is operable in said docked state, said computer connector being separate from said station connector when said computer is operable in said undocked state, said computer comprising:

a CPU capable of physical electrical communication with said bus of said computer; and an in-line docking agent coupled with said bus of said computer and between said bus of said computer and said station bus when said computer is in a docked state said in-line docking agent buffering signals communicated between said bus of said computer and said station bus on said data bus, said docking agent ensuring that said bus of said computer is quiet prior to said computer changing states without suspending said CPU in said computer by obtaining bus mastership of said bus and disabling a bus clock signal for said bus, whereby said computer remains powered ON when said computer changes states.

17. The computer of claim 16 wherein said docking agent receives a notice signal indicating that said computer is about to change states and said docking agent quiets said bus of said computer in response to said notice signal.

18. The computer of claim 16 wherein said docking agent is coupled to said bus of said computer as an off-line device.

19. The computer of claim 16 wherein said docking agent is an in-line device coupled between said bus of said computer and said computer connector.

20. The computer of claim 16 wherein said docking agent provides an interrupt to said CPU prior to said computer changing states.

21. In a dockable computer system comprised of a host computer station, including a station bus, and a mobile computer unit including a processor, and a unit bus, the unit bus including a data bus, wherein said system is capable of residing in at least two distinct states, a docked state in which said unit is operatively associated with said station and an undocked state in which said unit is physically separate from said station, the improvement comprising an in-line docking agent coupled between said unit bus and said station bus when said system is in said docked state, said docking agent performing at least a buffering function, and voltage translation function on signals on said data bus, said docking agent quieting said unit bus by obtaining bus mastership of said unit bus and disabling a bus clock signal for said bus without suspending said processor in said computer unit when said system changes from said undocked state to said docked state or from said docked state to said undocked state, whereby said mobile computer unit remains powered ON when said system changes from said undocked state to said docked state or from said docked state to said undocked state.

* * * * *